(12) United States Patent
Lee

(10) Patent No.: US 11,252,827 B2
(45) Date of Patent: Feb. 15, 2022

(54) DISPLAY DEVICE

(71) Applicant: KORTEK CORPORATION, Incheon (KR)

(72) Inventor: Kyoung Chan Lee, Seoul (KR)

(73) Assignee: KORTEK CORPORATION, Incheon (KR)

( * ) Notice: Subject to any disclaimer, the term of this patent is extended or adjusted under 35 U.S.C. 154(b) by 0 days.

(21) Appl. No.: 16/979,910

(22) PCT Filed: Feb. 13, 2019

(86) PCT No.: PCT/KR2019/001714
§ 371 (c)(1),
(2) Date: Sep. 11, 2020

(87) PCT Pub. No.: WO2019/190048
PCT Pub. Date: Oct. 3, 2019

(65) Prior Publication Data
US 2021/0014983 A1    Jan. 14, 2021

(30) Foreign Application Priority Data
Mar. 29, 2018 (KR) .......................... 10-2018-0036713

(51) Int. Cl.
*H05K 5/00* (2006.01)
*G06F 3/041* (2006.01)

(52) U.S. Cl.
CPC .......... *H05K 5/0017* (2013.01); *G06F 3/041* (2013.01)

(58) Field of Classification Search
CPC ........ G02F 1/1333; G02F 1/13; G06F 1/1637; G06F 3/041; H05K 5/0017
See application file for complete search history.

(56) References Cited

U.S. PATENT DOCUMENTS

| | | | | |
|---|---|---|---|---|
| 10,806,040 B2 * | 10/2020 | Kim | ................... | G02F 1/133308 |
| 2011/0221995 A1 * | 9/2011 | Park | .................... | G02F 1/13336 349/58 |
| 2014/0126183 A1 * | 5/2014 | Geng | ........................ | F21V 5/02 362/97.1 |
| 2015/0287365 A1 * | 10/2015 | Song | ..................... | G09G 3/3208 345/206 |

FOREIGN PATENT DOCUMENTS

| | | |
|---|---|---|
| JP | 2007102210 A | 4/2007 |
| KR | 20060039218 A | 5/2006 |
| KR | 20100052056 A | 5/2010 |
| KR | 20100052947 A | 5/2010 |
| KR | 101018784 B1 | 3/2011 |
| KR | 20150082373 A | 7/2015 |
| KR | 20170080221 A | 7/2017 |

OTHER PUBLICATIONS

International Search Report dated May 15, 2019 for PCT/KR2019/001714.

* cited by examiner

*Primary Examiner* — Nelson M Rosario
(74) *Attorney, Agent, or Firm* — Schmeiser, Olsen & Watts, LLP

(57) ABSTRACT

A display device is provided. A display device of embodiments the present invention include: an optical panel part disposed in a case part; a display part facing the optical panel part and including a plurality of display units connected to one another, each of the display units having an unpatterned edge formed in the peripheral portion thereof; and a transparent panel part facing the display part.

8 Claims, 8 Drawing Sheets

DISPLAY DEVICE

CROSS-REFERENCE TO RELATED APPLICATIONS

This application claims priority to PCT Application No. PCT/KR2019/001714, having a filing date of Feb. 13, 2019, based on KR 10-2018-0036713, having a filing date of Mar. 29, 2018, the entire contents both of which are hereby incorporated by reference.

FIELD OF TECHNOLOGY

The following relates to a display device, and more particularly, to a display device in which a display area can be increased.

BACKGROUND

In general, a display device includes a display part to output an image and a bezel surrounding an edge of the display part. An unpatterned edge, which is an area in which circuit lines are not formed, is provided on an edge of the display part. Display devices may be connected in series.

However, in the related art, two bezels overlap at both sides of display devices when the display devices are connected in series, thus reducing a display area in size due to the bezels. Therefore, there is a need to improve this problem.

Background art of embodiments of the present invention is disclosed in Korean Patent Publication No. 2017-0080221 (published on Jul. 10, 2017, and entitled "Display Apparatus Having Touch Panel).

SUMMARY

An aspect relates to a display device in which a display area can be increased.

A display device according to embodiments of the present invention includes an optical panel part disposed inside a case part; a display part facing the optical panel part and formed by connecting a plurality of display units, wherein an unpatterned edge is provided on a peripheral portion of each of the plurality of display units; and a transparent panel part facing the display part.

The transparent panel part may include a cover line part facing the unpatterned edges of the display units.

The display part may be formed by connecting the plurality of display units in parallel.

The plurality of display units may be disposed on the same plane.

The plurality of display units may be disposed on different planes.

The transparent panel part may be formed to form a plane parallel to the display part.

The display part may be formed by obliquely connecting the plurality of display units.

The transparent panel part may include a plurality of transparent-panel inclined parts in parallel to the plurality of display units.

A bottom case of the case part may include a plurality of case inclined parts in parallel to the plurality of display units.

The plurality of display units may be installed such that ends of neighboring unpatterned edges are face to face.

The plurality of display units may be arranged such that ends of neighboring unpatterned edges are misaligned.

The plurality of display units may be each formed in a curved shape, and the display part may be formed by connecting the plurality of display units.

The display part may further include a buffer member interposed between neighboring unpatterned edges.

The transparent panel part may further include a touch part thereon.

The touch part may be formed on a part of a plurality of display areas partitioned by the cover line part of the transparent panel part.

According to embodiments of the present invention, a plurality of display units are connected and thus a bezel is not installed between neighboring unpatterned edges. In this case, the bezel is installed only at both sides of a display part and thus a display area increases due to the absence of the bezel between unpatterned edges of the neighboring display units.

According to embodiments of the present invention, a display unit is modularized and thus the number of display units to be installed can be controlled according to the size of a display part. Because the display part is formed by connecting modularized display units, the display part can be manufactured in various sizes.

In addition, according to embodiments of the present invention, a cover line part is formed to face the unpatterned edges of the display units, thereby preventing the unpatterned edges of the display units from being seen from the outside.

BRIEF DESCRIPTION

Some of the embodiments will be described in detail, with reference to the following figures, wherein like designations denote like members, wherein.

DETAILED DESCRIPTION

Figure 1:
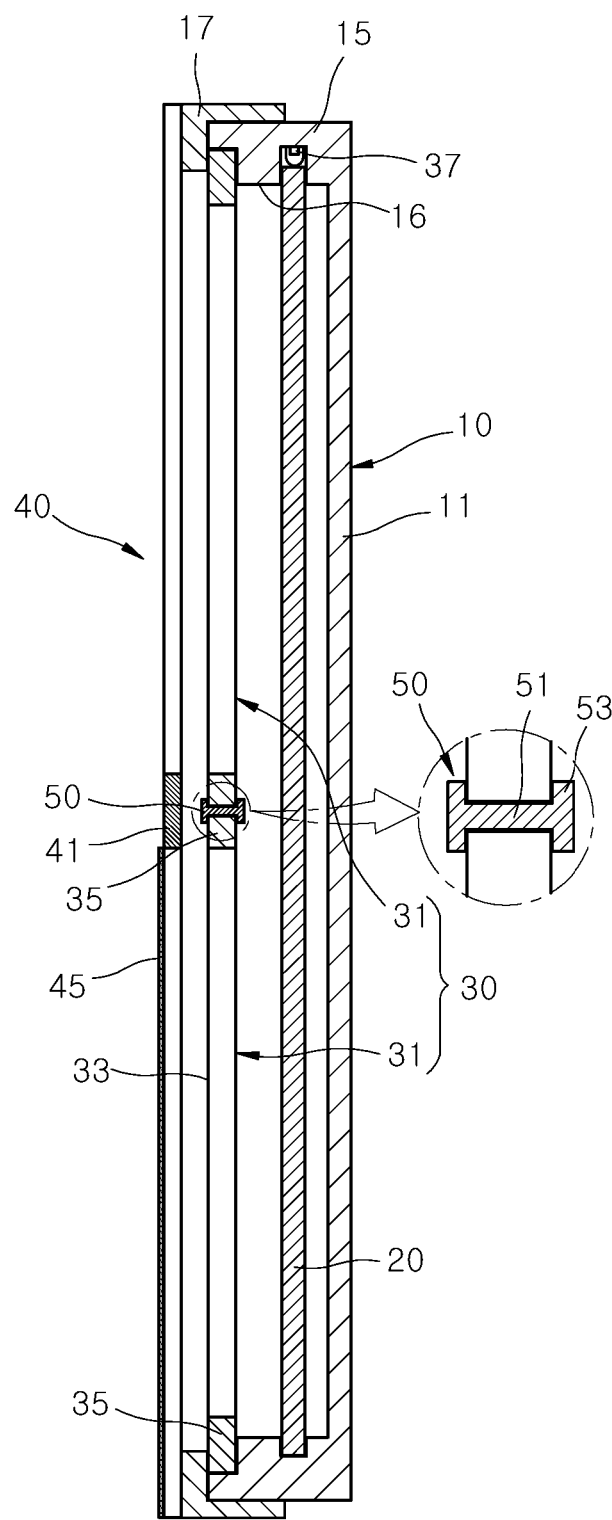
FIG. 1 is a cross-sectional view of a display device according to a first embodiment of the present invention.

Hereinafter, display devices according to embodiments of the present invention will be described with reference to the accompanying drawings. In describing the display devices, the thickness of lines or the size of components illustrated in the drawings may be exaggerated for clarity and convenience. Terms described below are defined in consideration of functions in embodiments of the present invention and thus may vary according to a user's intention, an operator's intention or a practice. Therefore, these terms should be defined based on the whole context of the present specification.

Figure 2:
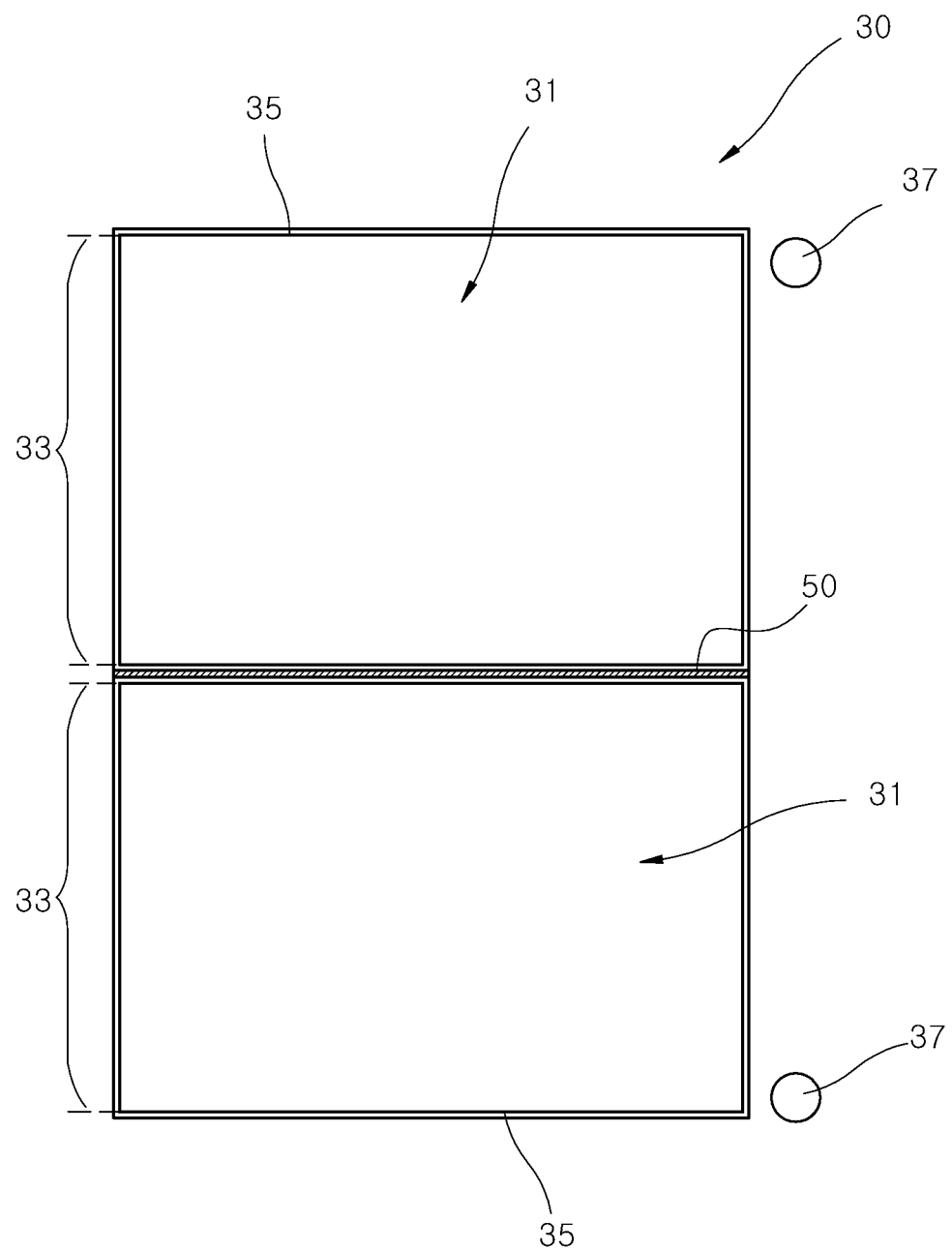
FIG. 2 is a schematic configuration diagram illustrating an arrangement state of display units in the display device according to the first embodiment of the present invention.

FIG. 1 is a cross-sectional view of a display device according to a first embodiment of the present invention. FIG. 2 is a schematic configuration diagram illustrating an arrangement state of display units in the display device according to the first embodiment of the present invention.

Referring to FIGS. 1 and 2, the display device according to the first embodiment of the present invention includes an optical panel part 20, a display part 30, and a transparent panel part 40.

The optical panel part 20 is disposed inside a case part 10. At least one light-emitting part 37 is provided at one side or on a peripheral portion of the optical panel part 20. A light-emitting diode (LED) device is provided as the light-emitting part 37.

The case part 10 includes a bottom case 11 and sidewall parts 15. The sidewall part 15 is provided in a frame shape on a peripheral portion of the bottom case 11. A bezel 17 is coupled to the sidewall part 15 to fix an unpatterned edge 35 of the display part 30. A cross section of the bezel 17 is formed in a "L" shape.

The optical panel part 20 includes a light guide plate (not shown), a diffusion sheet (not shown), a prism sheet (not shown), and the like. Light incident on the light guide plate travels in a horizontal direction and is reflected and refracted by a pattern (not shown) formed on the light guide plate and thus emitted in a vertical direction. The light emitted in the vertical direction becomes uniform in luminance while passing through the diffusion sheet, and the luminance thereof is increased while passing through the prism sheet.

The display part 30 faces the optical panel part 20 and is formed by connecting a plurality of display units 31 each having the unpatterned edge 35 on a peripheral portion thereof. Because the plurality of display units 31 are connected, the bezel 17 is not installed between neighboring unpatterned edges 35. In this case, because the bezel 17 is installed only at both sides of the display part 30, a display area 33 may be increased in the same sized display device due to the absence of the bezel 17 between the unpatterned edges 35 of the neighboring display units 31.

The display unit 31 is formed in a flat plate shape. The plurality of display units 31 may be formed in the same size or different sizes. Therefore, because a display unit 31 is modularized, the number of the display units 31 to be installed may be controlled according to the size of the display part 30. Furthermore, because the modularized display units are connected to form the display part 30, the display part 30 may be manufactured in various sizes. Various forms such as a liquid crystal display (LCD) panel, an organic light-emitting diode (OLED) panel, and an active matrix organic light-emitting diode (AMOLED) panel are applicable as the display part 30.

The unpatterned edge 35 refers to an area of the display part 30 in which a circuit pattern (not shown) is not formed. The unpatterned edge 35 may be formed by performing a black matrix process on the peripheral portion of the display part 30. The black matrix process refers to a process of coating the display part 30 with a black material, which absorbs light, or allowing the black material to penetrate the display part 30 so that light from the display part 30 may not be reflected to the outside. Because the circuit pattern is not formed on the unpatterned edge 35, an image is not displayed thereon.

A circuit pattern is formed on each of the display units 31, and an area of the display unit 31 excluding the unpatterned edge 35 is defined as the display area 33. An image is displayed on the display area 33.

The transparent panel part 40 faces the display part 30, and a cover line part 41 is formed to face the unpatterned edge 35 of the display unit 31. The transparent panel part 40 prevents the display part 30 from being scratched or foreign matter from adhering to the display part 30. The transparent panel part 40 is formed of one of various types of transparent materials such as a glass material and an acrylic material.

The cover line part 41 is black-matrix-processed to prevent the unpatterned edge 35 of the display unit 31 from being seen from the outside. The cover line part 41 may be formed in a straight line along the unpatterned edge 35 of the display part 30. In this case, when the plurality of display units 31 are connected in the horizontal direction, the cover line part 41 is formed to extend in the vertical direction. When the plurality of display units 31 are connected in the vertical direction, the cover line part 41 is formed to extend in the horizontal direction. When the plurality of display units 31 are connected in the horizontal direction and the vertical direction, the cover line part 41 is formed in a grid shape in the horizontal direction and the vertical direction.

The display part 30 is formed by connecting the plurality of display units 31 in parallel. In this case, the plurality of display units 31 may be disposed on the same plane. In addition, the plurality of display units 31 are installed such that ends of neighboring unpatterned edges 35 are face to face. Therefore, images may be activated on the same plane on the display part 30.

The transparent panel part 40 is formed to form a plane parallel to the display part 30. In this case, the transparent panel part 40 may be formed in the form of a flat panel.

The bottom case 11 of the case part 10 is formed parallel to the plane of the transparent panel part 40. The sidewall part 15 extending to one side is provided on a peripheral portion of the bottom case 11. A gap maintaining part 16 is provided on an inner side of the sidewall part 15 to maintain a gap between the optical panel part 20 and the display part 30. The gap maintaining part 16 is formed along the peripheral portion of the case part 10 to support the unpatterned edge 35 of the display part 30. In this case, when the display part 30 is formed in a square plate shape, the gap maintaining part 16 may be formed in a square frame shape.

The bezel 17 is provided at an end of the sidewall part 15 to fix the display part 30. A cross section of the bezel 17 is formed in a "¬" shape to bring an outer side of the sidewall part 15 and the unpatterned edge 35 of the display part 30 into close contact with each other. The bezel 17 may be formed in a square frame shape to be coupled to a peripheral portion of the sidewall part 15. The bezel 17 is formed to cover the unpatterned edge 35.

The display part 30 further includes a buffer member 50 interposed between neighboring unpatterned edges 35. The buffer member 50 is formed of a cushion material. Because the buffer member 50 is interposed between the neighboring unpatterned edges 35, the neighboring unpatterned edges 35 may be prevented from coming into contact with each other. Therefore, it is possible to prevent damage to the display part 30.

The buffer member 50 includes a buffer spacer 51 and a buffer holder 53. The buffer spacer 51 is disposed between neighboring unpatterned edges 35. The buffer holder 53 protrudes from the buffer spacer 51 to constrain the unpatterned edge 35. The buffer spacer 51 prevents contact between neighboring unpatterned edges 35. Because both sides of the unpatterned edge 35 are constrained by the buffer holder 53, the display part 30 may be prevented from being separated from the buffer member 50. Here, the constraining of the unpatterned edge 35 should be understood to mean that the unpatterned edge 35 is attached to, fixed onto, or inserted into the buffer member 50.

The transparent panel part 40 further includes a touch part 45 thereon. The touch part 45 is a transparent panel which is capable of sensing a touch or pressure to operate the display device and through which an image displayed on the display part 30 may be viewed.

Various forms, such as an optical film using infrared rays, a transparent electrode type film using a point of contact of a transparent conductive film formed by coating a polyester film with an indium tin oxide film, a transparent conductive film formed by coating stainless steel wire with a transparent conductive film, and a capacitive film for detecting a change in capacitance, are applicable as the touch part 45.

The touch part 45 is disposed to face some of the plurality of display units 31. Alternatively, the touch part 45 may be mounted on the transparent panel part 40 to face a part of the display area 33 of one of the display units 31.

Because the touch part 45 is provided on the transparent panel part 40 corresponding to the part of the display areas 33, manufacturing costs of the display device can be reduced. The touch part 45 may not be mounted on the display area 33 of the display part 30 for which the touch part 45 is unnecessary.

Next, a display device according to a second embodiment of the present invention will be described. The second embodiment is substantially the same as the first embodiment except for an arrangement form of display units and thus features of the second embodiment will be described below.

Figure 3:
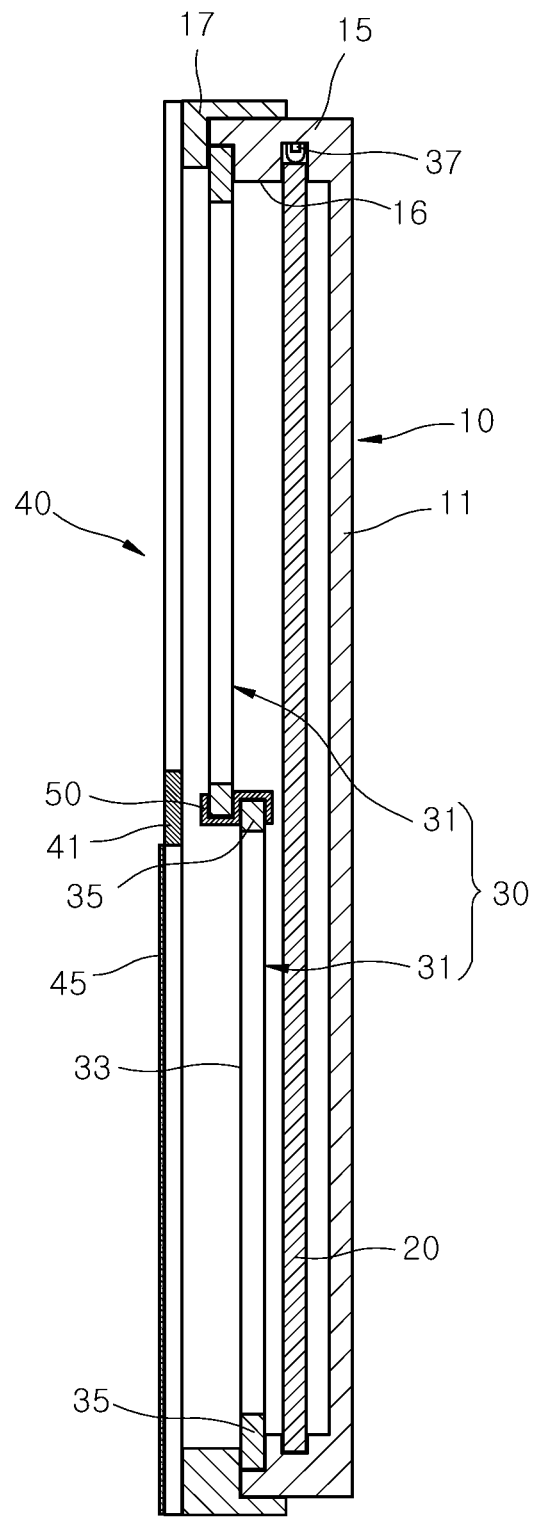
FIG. 3 is a cross-sectional view of a display device according to a second embodiment of the present invention.

FIG. 3 is a cross-sectional view of the display device according to the second embodiment of the present invention.

Referring to FIG. 3, a plurality of display units 31 are disposed on different planes. In this case, neighboring unpatterned edges 35 of the plurality of display units 31 overlap each other to firm a step. Because the neighboring unpatterned edges 35 of the plurality of display units 31 overlap each other to form the step, the unpatterned edges 35 may be reduced in width. The reduction in the width of the unpatterned edges 35 results in a reduction in a width of a cover line part 41.

A transparent panel part 40 is formed to form a plane parallel to a display part 30. The transparent panel part 40 is formed in a flat plate shape.

Next, a display device according to a third embodiment of the present invention will be described. The third embodiment is substantially the same as the first embodiment except for shapes of display units, a transparent panel part, and a case part and thus features of the third embodiment will be described below.

Figure 4:
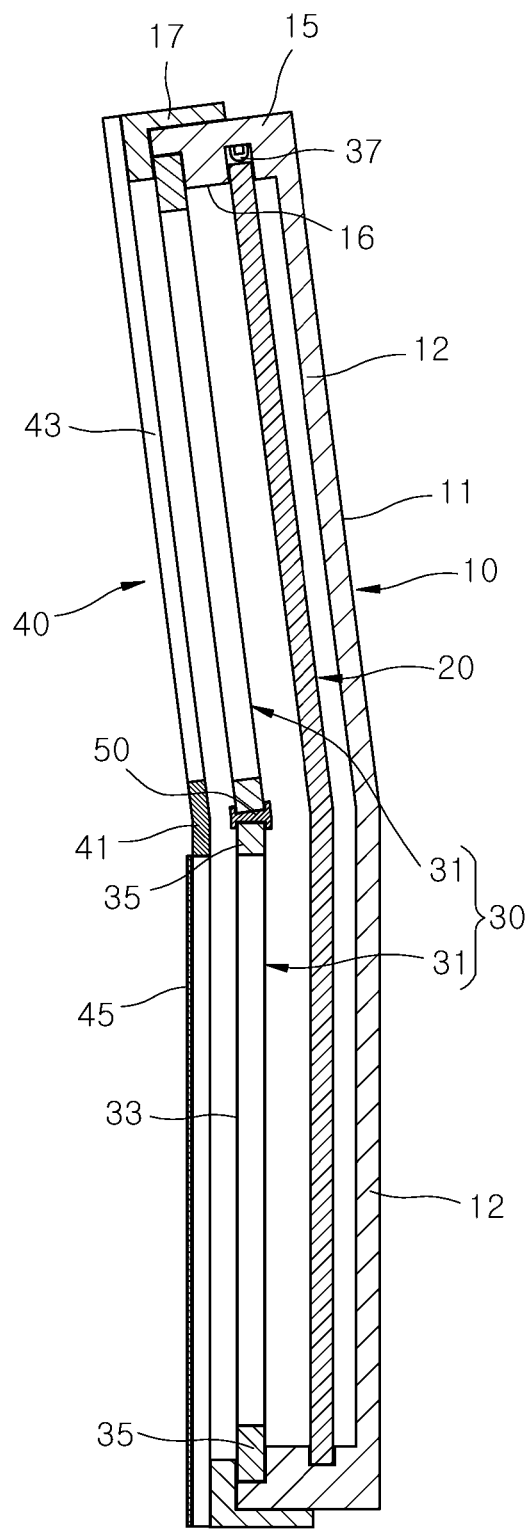
FIG. 4 is a cross-sectional view of a display device according to a third embodiment of the present invention.

FIG. 4 is a cross-sectional view of the display device according to the third embodiment of the present invention.

Referring to FIG. 4, a display part 30 is formed by obliquely connecting a plurality of display units 31. Because the plurality of display units 31 are connected obliquely, the display part 30 on which a part of an image is displayed obliquely may be manufactured.

The plurality of display units 31 are installed such that ends of neighboring unpatterned edges 35 are face to face obliquely. In this case, in a buffer member 50, both sides of a buffer spacer 51 are formed obliquely and a buffer holder 53 protrudes obliquely from the buffer spacer 51 (see FIG. 1).

In a transparent panel part 40, a plurality of transparent-panel inclined parts 43 are formed to be parallel to the plurality of display units 31. Each of the transparent-panel inclined parts 43 may be inclined at the same angle as or a slightly different angle than an angle of the display unit 31 opposite thereto.

A bottom case 11 of a case part 10 includes a plurality of case inclined parts 12 in parallel to the plurality of display units 31. Because the bottom case 11 and the transparent panel part 40 are formed obliquely, the display device may be manufactured to have an entirely or partially bent exterior.

Next, a display device according to a fourth embodiment of the present invention will be described. The fourth embodiment is substantially the same as the third embodiment except for a shape of display units and thus features of the fourth embodiment will be described below.

Figure 5:
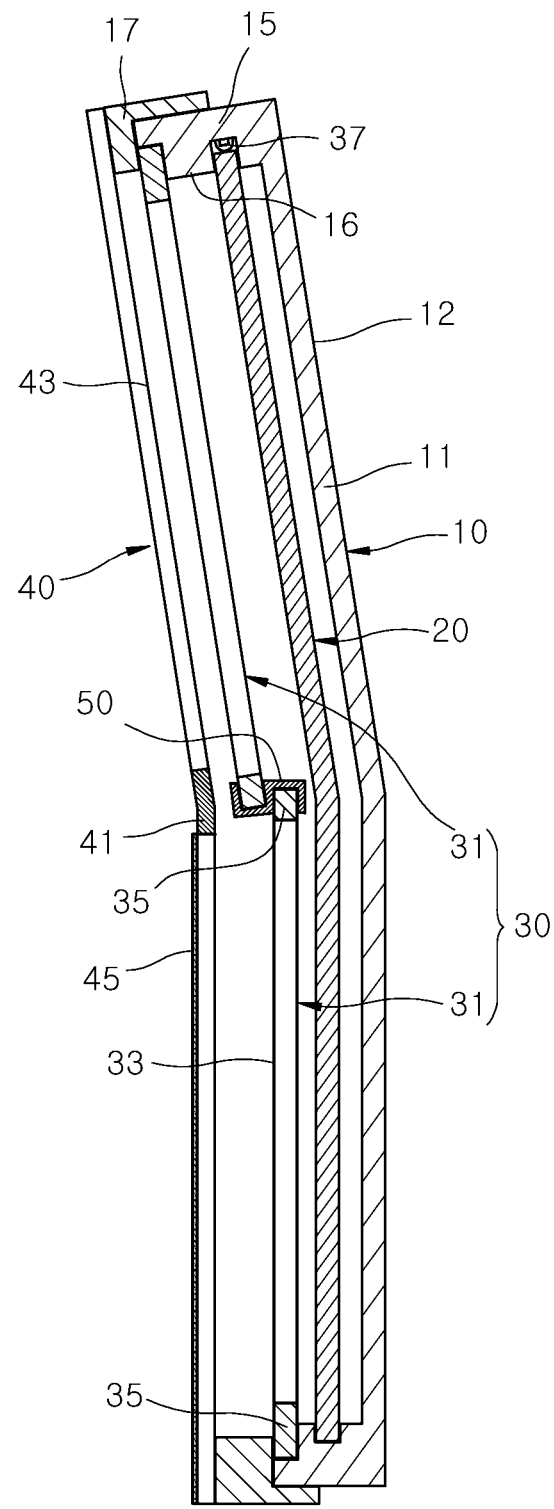
FIG. 5 is a cross-sectional view of a display device according to a fourth embodiment of the present invention.

FIG. 5 is a cross-sectional view of the display device according to the fourth embodiment of the present invention.

Referring to FIG. 5, a display part 30 is formed by obliquely connecting a plurality of display units 31. The plurality of display units 31 are connected obliquely. In addition, the plurality of display units 31 are installed such that ends of neighboring unpatterned edges 35 are misaligned.

Because the plurality of display units 31 are connected obliquely, the display part 30 on which a part of an image is displayed obliquely may be manufactured. Because the ends of the neighboring unpatterned edges 35 are misaligned, the unpatterned edges 35 may be reduced in width. The reduction in the width of the unpatterned edges 35 results in a reduction in a width of a cover line part 41.

In a buffer member 50, a buffer spacer 51 is formed to be inclined with respect to the display units 31, and a buffer holder 53 protrudes obliquely from the buffer spacer 51.

Next, a display device according to a fifth embodiment of the present invention will be described. The fifth embodiment is substantially the same as the third embodiment except for shapes of display units and a transparent panel part and thus features of the fifth embodiment will be described below.

Figure 6:
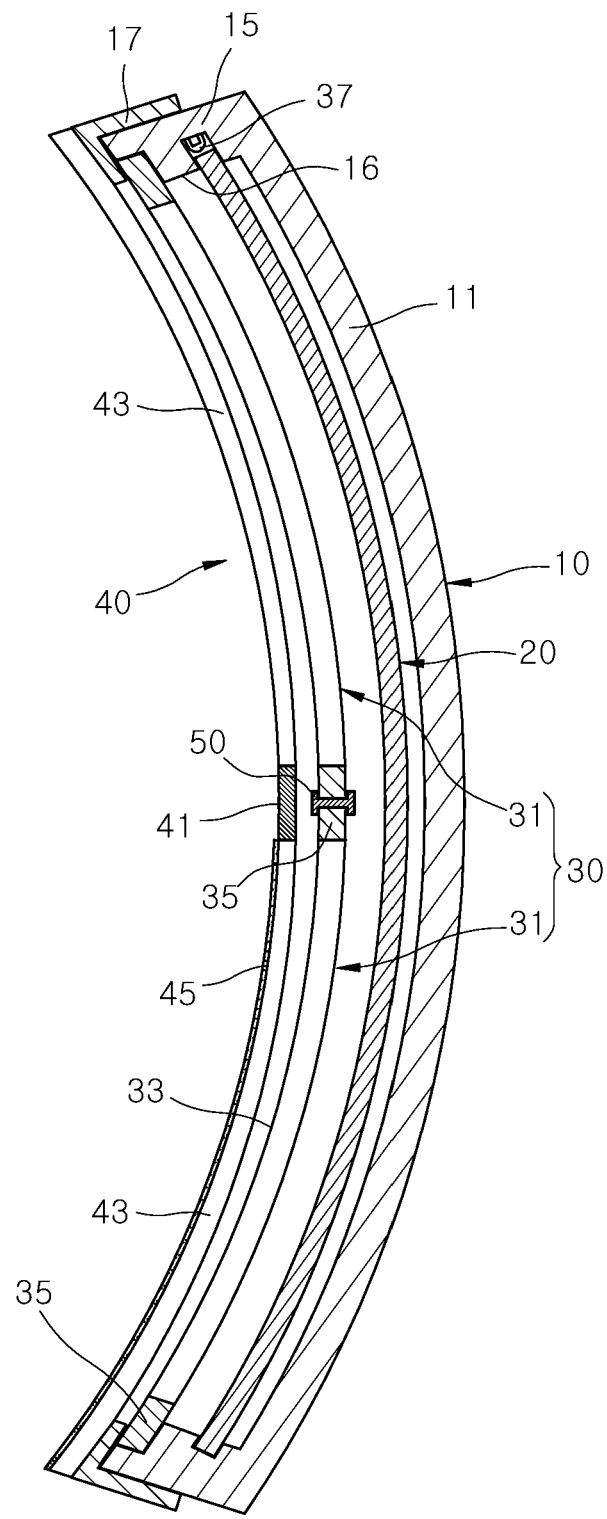
FIG. 6 is a cross-sectional view of a display device according to a fifth embodiment of the present invention.

FIG. 6 is a cross-sectional view of the display device according to the fifth embodiment of the present invention.

Referring to FIG. 6, a display part 30 is formed by connecting a plurality of display units 31. In this case, the plurality of display units 31 are each formed in a curved shape. Accordingly, the display part 30 may be manufactured in a curved shape by connecting the plurality of display units 31.

Ends of the plurality of display units 31 may be arranged face to face or to be misaligned. The plurality of display units 31 may be disposed on the same curved surface or a stepped curved surface.

Next, an arrangement form of display units according to embodiments of the present invention will be described.

Figure 7:
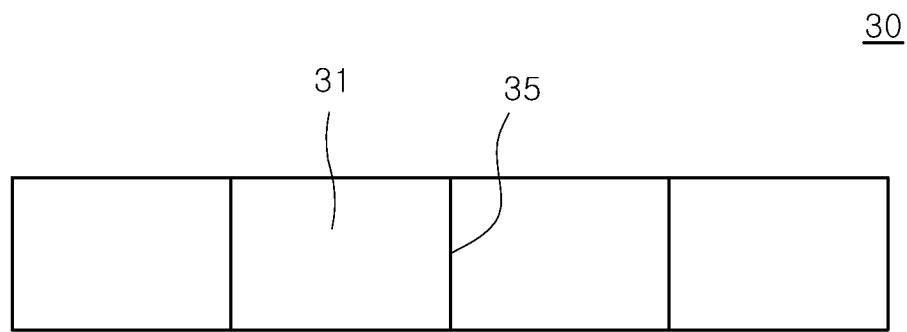
FIG. 7 is a schematic configuration diagram illustrating a first arrangement state of display units in a display device according to embodiments of the present invention.
Figure 8:
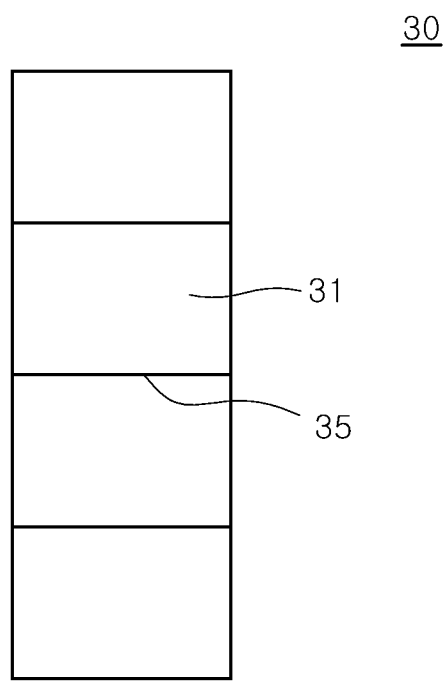
FIG. 8 is a schematic configuration diagram illustrating a second arrangement state of display units in a display device according to embodiments of the present invention.
Figure 9:
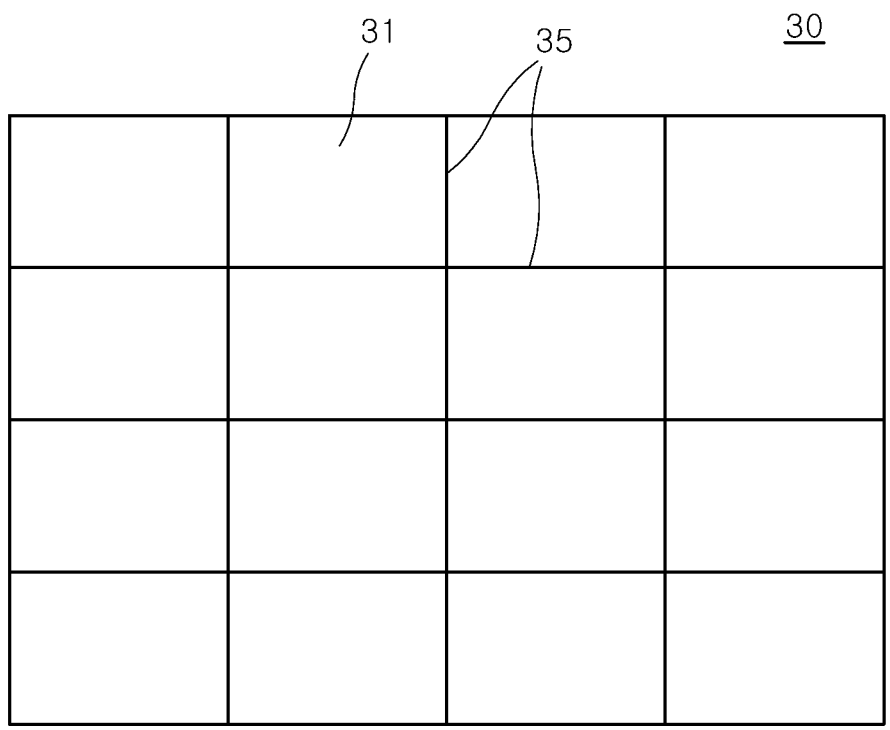
FIG. 9 is a schematic configuration diagram illustrating a third arrangement state of display units in a display device according to embodiment of the present invention.

FIG. 7 is a schematic configuration diagram illustrating a first arrangement state of display units in a display device according to embodiments of the present invention. FIG. 8 is a schematic configuration diagram illustrating a second arrangement state of display units in a display device according to embodiments of the present invention. FIG. 9 is a schematic configuration diagram illustrating a third arrangement state of display units in a display device according to embodiments of the present invention.

Referring to FIGS. 7 to 9, the plurality of display units 31 may be connected in a row in a horizontal direction (see FIG. 7). In this case, the unpatterned edge 35 and the cover line part 41 are arranged side by side in a vertical direction. Therefore, a display device may be manufactured to extend in the horizontal direction.

The plurality of display units 31 may be connected in a column in the vertical direction (see FIG. 8). In this case, the unpatterned edge 35 and the cover line part 41 are arranged side by side in the horizontal direction. Therefore, a display device may be manufactured to extend in the vertical direction.

Alternatively, the plurality of display units 31 may be connected to be arranged in both of the horizontal and vertical directions (see FIG. 9). In this case, the unpatterned edges 35 cross in the vertical direction and the horizontal direction to form a grid, and similarly, the cover line part 41 is formed in a grid shape.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A display device comprising:
   an optical panel part disposed inside a case part;
   a display part facing the optical panel part and formed by connecting a plurality of display units, wherein an unpatterned edge is provided on a peripheral portion of each of the plurality of display units;
   a transparent panel part facing the display part; and
   a touch part is formed on the transparent panel part,
   wherein the plurality of display units are disposed on different planes;
   wherein the transparent panel part comprises a cover line part facing the unpatterned edges of the display units;
   wherein the cover line part formed by performing a black matrix process on the transparent panel part;
   wherein the touch part is formed on a part of a plurality of display areas partitioned by the cover line part of the transparent panel part;
   wherein neighboring unpatterned edges of the plurality of display units overlap each other to form a step;
   wherein the display part further comprises a buffer member interposed between the neighboring unpatterned edges;
   wherein the buffer member is formed in a zigzag shape so that the neighboring unpatterned edges is inserted.

2. The display device of claim 1, wherein the display part is formed by connecting the plurality of display units in parallel.

3. The display device of claim 1, wherein the transparent panel part is formed to form a plane parallel to the display part.

4. The display device of claim 1, wherein the display part is formed by obliquely connecting the plurality of display units.

5. The display device of claim 4, wherein the transparent panel part comprises a plurality of transparent-panel inclined parts in parallel to the plurality of display units.

6. The display device of claim 5, wherein a bottom case of the case part comprises a plurality of case inclined parts in parallel to the plurality of display units.

7. The display device of claim 1, wherein the plurality of display units are arranged such that ends of neighboring unpatterned edges are misaligned.

8. The display device of claim 1, wherein the plurality of display units are each formed in a curved shape.

* * * * *